Aug. 1, 1933.　　　T. C. SEWELL　　　1,920,895
SUGAR DISPENSER
Filed Aug. 29, 1932
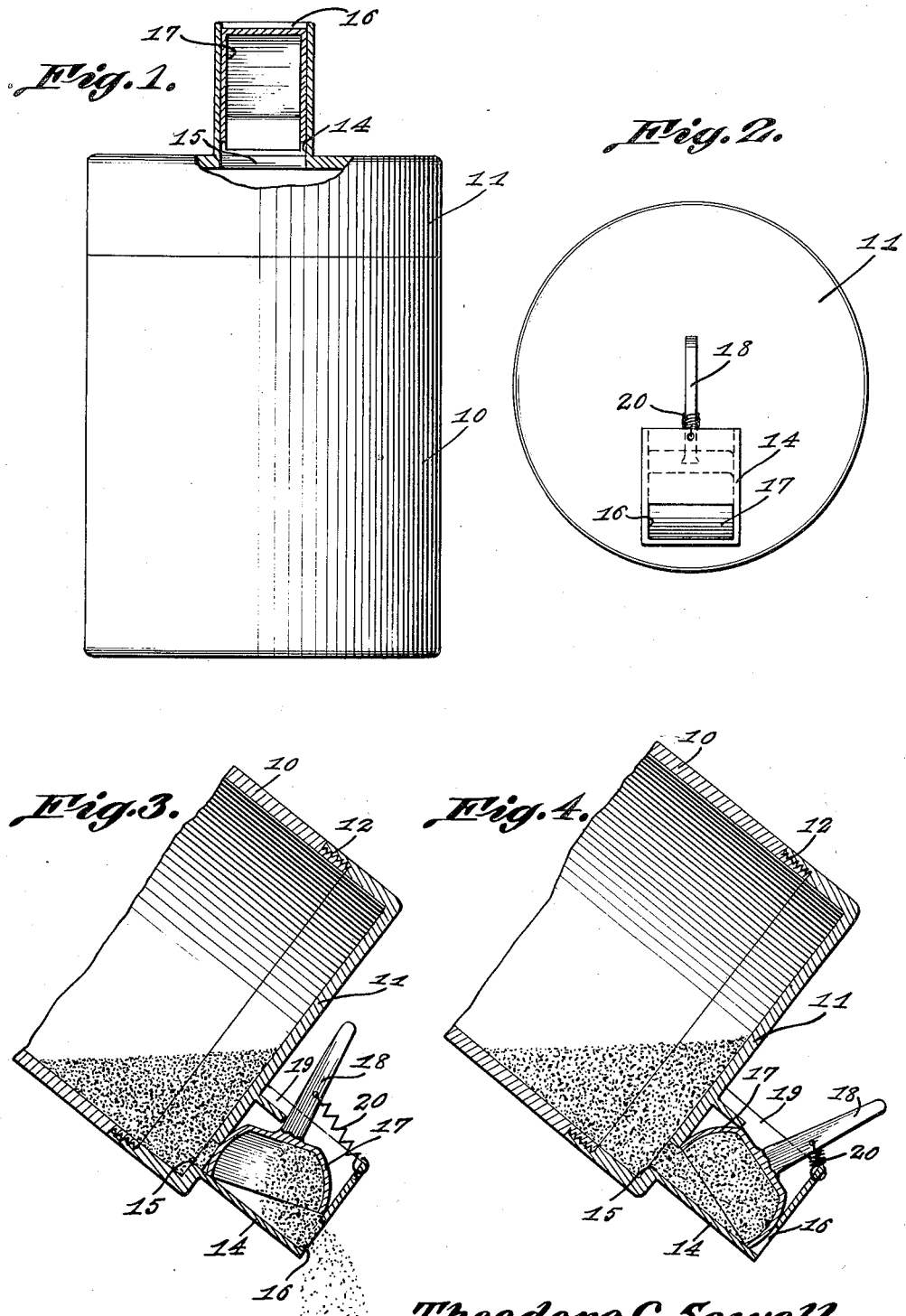
Theodore C. Sewell, INVENTOR
BY Victor J. Evans & Co.
ATTORNEY Patented Aug. 1, 1933

1,920,895

UNITED STATES PATENT OFFICE 1,920,895

SUGAR DISPENSER

Theodore C. Sewell, Portland, Oreg.

Application August 29, 1932. Serial No. 630,940

3 Claims. (Cl. 221—98)

The object of the invention is to provide a device for the reception and dispensing of sugar and condiments, so that they may not be contaminated by extraneous matter; to provide a dispenser of the kind indicated in which the contents is dispensed in designated quantities; and generally to provide a dispenser which is of simple form and susceptible of cheap manufacture.

With this object in view, the invention consists in a construction and combination of parts of which a preferred embodiment is illustrated in the accompanying drawing but to which embodiment the invention is not to be restricted. Continued use in practice may dictate certain changes or alterations and the right is claimed to make any which fall within the scope of the annexed claims.

In the drawing:

Figure 1 is an elevational view of the invention partly broken away.

Figure 2 is a top plan view.

Figure 3 is a sectional view of the discharge end of the device in inverted position with the parts in the final step of discharging a designated quantity of the contents.

Figure 4 is a view similar to Figure 3 but showing the parts in the intermediate position which is just prior to the dispensing step.

The invention comprises a container 10 made of any acceptable material and of any desired shape, the container being closed with a removable cover 11, threadingly engaged with it as indicated at 12. The cover is formed with an integral discharge chamber 14 which is placed in communication with the interior of the container through an opening 15 formed in the cover member, the discharge chamber being provided with a discharge mouth or opening 16.

Positioned within the chamber 14 is an inverted cup member 17, open on the bottom but closed on the top and having an integral actuating lever 18 extending from the top and passing through a clearance opening 19 formed in one wall of the chamber 14, this opening extending from the top wall of the chamber 14 to a point spaced from but adjacent the top face of the cover 11.

A spring 20 terminally anchored to the lever or handle 18 and also terminally anchored to the top wall of the chamber 14, functions to keep the cup member 17 normally in the position indicated in Figure 4, when the cup member at that edge adjacent the top of the chamber 14 will bear on the side wall of said chamber, so that the pull exerted by the spring 20 will tilt the cup member up to bring the opposite edge above the opening 15. When the container is inverted, as indicated in Figure 4, the contents will pass through the opening 15 into the chamber 14, filling the cup 17. If the lever 18 now be forced back toward the cover 11, the side wall of the cup will function to progressively close the opening 15 and similarly uncover the opening 16 which it closed formerly, as shown in Figure 4. The contents trapped in the cup are then in a position to be discharged through the opening 16, as indicated in Figure 3.

Since the cup is of a specified size volumetrically, each operation of swinging the handle 18 will result in the discharge from the container of bulks of the contents substantially equal in volume to the volume of the cup.

The invention having been described, what is claimed as new and useful is:

1. A sugar dispenser comprising a container, a discharge chamber mounted on the top thereof and in communication with the container through a port in the top, the discharge chamber having a discharge port, and a cup mounted in the discharge chamber and rockable to close the port of communication between the chamber and the container and open the discharge port of the chamber, and vice versa.

2. A sugar dispenser comprising a container, a discharge chamber mounted on the top thereof and in communication with the container through a port in the top, the discharge chamber having a discharge port, and a cup mounted in the discharge chamber and rockable to close the port of communication between the chamber and the container and open the discharge port of the chamber, and vice versa, the cup being freely mounted in the discharge chamber, and having an actuating handle extending through an opening in the side wall of the discharge chamber.

3. A sugar dispenser comprising a container, a discharge chamber mounted on the top thereof and in communication with the container through a port in the top, the discharge chamber having a discharge port, and a cup mounted in the discharge chamber and rockable to close the port of communication between the chamber and the container and open the discharge port of the chamber, and vice versa, the cup being freely mounted in the discharge chamber and having an actuating handle extending through an opening in the side wall of the discharge chamber, and a spring tensioned between the handle and a point on the discharge chamber to yieldingly hold the cup in the position of closure for the discharge port and open position for the port of communication between the container and the discharge chamber.

THEODORE C. SEWELL.